US011137549B2

(12) United States Patent
Anderson

(10) Patent No.: US 11,137,549 B2
(45) Date of Patent: Oct. 5, 2021

(54) SCALABLE AND FULLY-ADJUSTABLE MULTIPLE FIBER HOLDER

(71) Applicant: Raytheon Company, Waltham, MA (US)

(72) Inventor: Timothy C. Anderson, McKinney, TX (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 16/663,489

(22) Filed: Oct. 25, 2019

(65) Prior Publication Data

US 2021/0124127 A1    Apr. 29, 2021

(51) Int. Cl.
*G02B 6/36* (2006.01)
*G02B 6/38* (2006.01)
*G02B 6/44* (2006.01)

(52) U.S. Cl.
CPC ......... *G02B 6/3616* (2013.01); *G02B 6/3897* (2013.01); *G02B 6/4441* (2013.01); *G02B 6/4453* (2013.01); *G02B 6/4454* (2013.01); *G02B 6/4457* (2013.01)

(58) Field of Classification Search
CPC ...... G02B 6/4455; G02B 6/3616; G02B 6/36; G02B 6/3897; G02B 6/4454; G02B 6/4441; G02B 6/4457; G02B 6/4453
See application file for complete search history.

(56) References Cited

U.S. PATENT DOCUMENTS 6,695,620 B1    2/2004   Huang
9,063,316 B2 *  6/2015   Loeffelholz .......... G02B 6/4441
9,411,109 B2    8/2016   Machewirth et al.
2008/0101751 A1   5/2008  Luther et al.
2008/0205823 A1   8/2008  Luther et al.
(Continued)

FOREIGN PATENT DOCUMENTS

| DE | 4230418 A1 | * | 3/1994 | ........... H05K 7/1421 |
| JP | 56036617 A | * | 4/1981 | ........... G02B 6/3897 |
| JP | 2009284692 A | | 12/2009 | |

OTHER PUBLICATIONS

International Search Report and Written Opinion from related PCT Application No. PCT/US2020/032004, dated Sep. 1, 2020.

*Primary Examiner* — Ryan A Lepisto
*Assistant Examiner* — Erin D Chiem
(74) *Attorney, Agent, or Firm* — Burns & Levinson, LLP; Joseph M Maraia

(57) ABSTRACT

An optical fiber holder includes a first holder having a first upper surface and a first lower surface. The optical fiber holder is configured to be in contact with a working station through the first lower surface. Further, the optical fiber holder can include a second holder having a second upper surface and a second lower surface. The second holder can be operably attached to the first holder through the second lower surface. Also, the second holder is configured to rotate with respect to the first holder. Further, the optical fiber holder can include a third holder having plurality of holes therethrough configured to receive a respective plurality of optical fibers. The third holder can include a plurality of protrusions operably coupled to the second holder and configured to enable the third holder to move with respect to the second holder.

16 Claims, 13 Drawing Sheets

(56) References Cited

U.S. PATENT DOCUMENTS

| | | | | |
|---|---|---|---|---|
| 2010/0104243 A1* | 4/2010 | Kewitsch | ............. | G02B 6/3825 |
| | | | | 385/60 |
| 2018/0231730 A1* | 8/2018 | Geens | ................... | G02B 6/4453 |
| 2020/0150373 A1* | 5/2020 | Croucher | ............. | G02B 6/4453 |

* cited by examiner

SCALABLE AND FULLY-ADJUSTABLE MULTIPLE FIBER HOLDER

STATEMENT OF GOVERNMENT SUPPORT

This invention was made with government support from the Department of Defense under Contract No. W9113M-17-D-0006-0002. The U.S. Government has certain rights in the invention.

FIELD OF THE INVENTION

The disclosure relates to an optical fiber holder for use in high energy laser (HEL) systems, and more particularly, to an optical fiber holder for holding multiple fibers while allowing them to be individually adjusted.

BACKGROUND OF THE INVENTION

HEL systems use multiple laser fibers and combine them for high power. One previous concept provides a four-fiber mount that allows alignment of the fibers to each other, but has no adjustability for the array, which means the array cannot be swapped out without the system being realigned to it. It also does not have final locking features to ensure the fibers do not move after adjustment and would therefore, not be stable in an operational environment. Based on this arrangement, the scaling to a larger number of fibers would create an unstable design.

Therefore, there is a need for a "field-able" fiber mount that holds multiple fiber endcaps, allows them to be individually adjusted relative to each other, and then be placed into the laser system and be aligned as an array to the existing system.

BRIEF SUMMARY OF THE INVENTION

According to various embodiments, an optical fiber holder is provided. The optical fiber holder can include a first holder having a first upper surface and a first lower surface. The optical fiber holder is configured to be in contact with a working station through the first lower surface. Further, the optical fiber holder can include a second holder having a second upper surface and a second lower surface. The second holder can be operably attached to the first holder through the second lower surface. Also, the second holder is configured to rotate with respect to the first holder. Further, the optical fiber holder can include a third holder including a first portion having plurality of holes therethrough. Each hole is configured to receive a respective plurality of optical fibers. The first portion of the third holder can include a plurality of protrusions operably coupled to the second holder and configured to enable the third holder to move with respect to the second holder. Each of the plurality of optical fibers has an endcap and is configured to rotate and translate in the plurality of holes.

In some embodiments, the plurality of protrusions are connected to the second holder through a plurality of adjusters. In other embodiments, the plurality of protrusions comprises of first, second and third protrusions.

In some embodiments, each of the plurality of holes includes an adhesive material to hold the optical fibers in their respective holes after alignment. In some embodiments, the plurality of optical fibers includes a respective plurality of end caps. In some embodiments, each of the plurality of end caps is located in a respective one of the plurality of holes. In some embodiments, the plurality of end caps are made of fused silica.

In some embodiments, the second holder can include a first beam having a first end and a second end, and a first curved piece being attached to the first end and the second end of the first beam. Further, the second holder can include a second curved piece being attached to the first beam. The first curved piece and the second curved piece being located on opposite sides of the first beam. Further, the second holder can include a second beam being attached to the first curved piece and the first beam, the second beam being perpendicular to the first beam.

In some embodiments, the first portion of the third holder includes a planar top piece and a planar bottom piece having first, second, third, and fourth corners, a length between the first and second corners being greater than the length between the first and the third corners and being equal to the length between the third and fourth corners. The planar bottom piece can be attached to the planar top piece and can define the plurality of holes therethorugh. The plurality of holes can be located on a plane perpendicular to a virtual Y-axis defined from the first upper surface to the first lower surface. The second and third protrusions are connected to the bottom piece at the first corner and the second corner, respectively.

In some embodiments, the third holder includes a second portion. The second portion can include a third beam having a first end and a second end, the first end being attached to the first portion of the third holder and the second end being attached to a first hollow rectangular piece and a second hollow rectangular piece. The first and second hollow rectangular pieces can be located at opposite sides of the third beam and can be in a same plane as the third beam. The third beam can have the first protrusion at the second end being operably connected to the second holder.

In some embodiments, the first holder is configured to move along a virtual X-axis and a Z-axis defined in a plane parallel to the first lower surface of the first holder.

In some embodiments, the third holder can move in the virtual Y-axis at times the first, second, and third protrusions move along the virtual Y-axis. In other embodiments, the third holder can rotate about the virtual X-axis at times the first protrusion moves along the virtual Y-axis. In some embodiments, can rotate about the virtual Z-axis at times the second and third protrusions move along the virtual Y-axis.

According to certain embodiments, a method of aligning a plurality of optical fibers is provided. The method can include attaching a first holder, having a first upper surface and a first lower surface, to a working station through the first lower surface. The method can further include, attaching a second holder, having a second upper surface and a second lower surface, to the first holder through the second lower surface, such that the second holder is rotatable with respect to the first holder. Further, the method can include attaching a third holder, having a third upper surface and a third lower surface, to the second holder through the third lower surface, such that the third holder is movable with respect to the second holder, the third holder including a first portion having plurality of holes therethrough. The method can include inserting each of a plurality of optical fibers through respective holes of the plurality of holes in the third holder such that each of the plurality of optical fibers is rotatable and translatable in its respective hole.

In some embodiments, attaching the third holder to the second holder is through a plurality of protrusions. The plurality of protrusions can include a first, second and third protrusions each having a linear adjuster.

BRIEF DESCRIPTION OF THE DRAWINGS

Various aspects of at least one embodiment of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention.

DETAILED DESCRIPTION

Figure 1A:
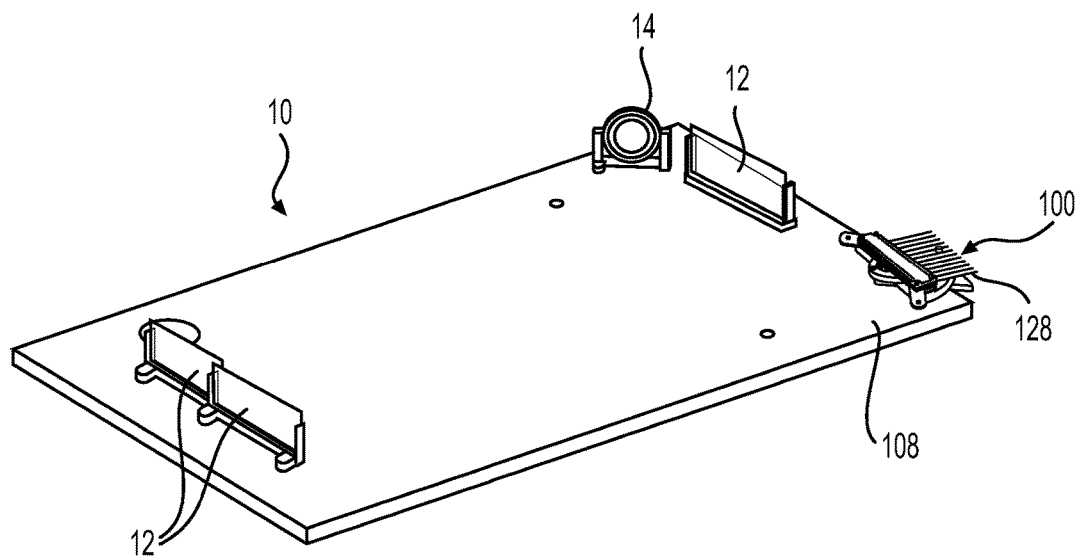
FIG. 1A-1B illustrate isometric view and top view of an optical system, according to certain embodiments.

In the following detailed description, numerous specific details are set forth in order to provide a thorough understanding of the embodiments of the present disclosure. It will be understood by those of ordinary skill in the art that these embodiments may be practiced without some of these specific details. In other instances, well-known methods, procedures, components and structures may not have been described in detail so as not to obscure the described embodiments.

Prior to describing at least one embodiment in detail, it is to be understood that the claims are not limited in their application to the details of construction and the arrangement of the components set forth in the following description or illustrated in the drawings. Also, it is to be understood that the phraseology and terminology employed herein are for the purpose of description only and should not be regarded as limiting.

The present disclosure provides an optical fiber device that can hold multiple fibers, e.g., two fibers to hundreds of fibers, and allows them to be individually adjusted relative to each other, and then be placed into a laser system and be aligned as an array to the existing system. The present disclosure allows the individual fibers to be adjusted in 6 degrees of freedom relative to each other. In addition, the present disclosure provide a device in which the entire array of fibers can be adjusted in 6 degrees of freedom, which allows the user to align an existing optical system. The alignment of fibers is performed by integrated features and external tooling. After alignment, using bond injection, the fibers will be locked in their space.

More specifically, the present disclosure provides a device to adjust multiple fibers individually relative to each other and is scalable for any quantity and any size of fibers.

Figure 1B:
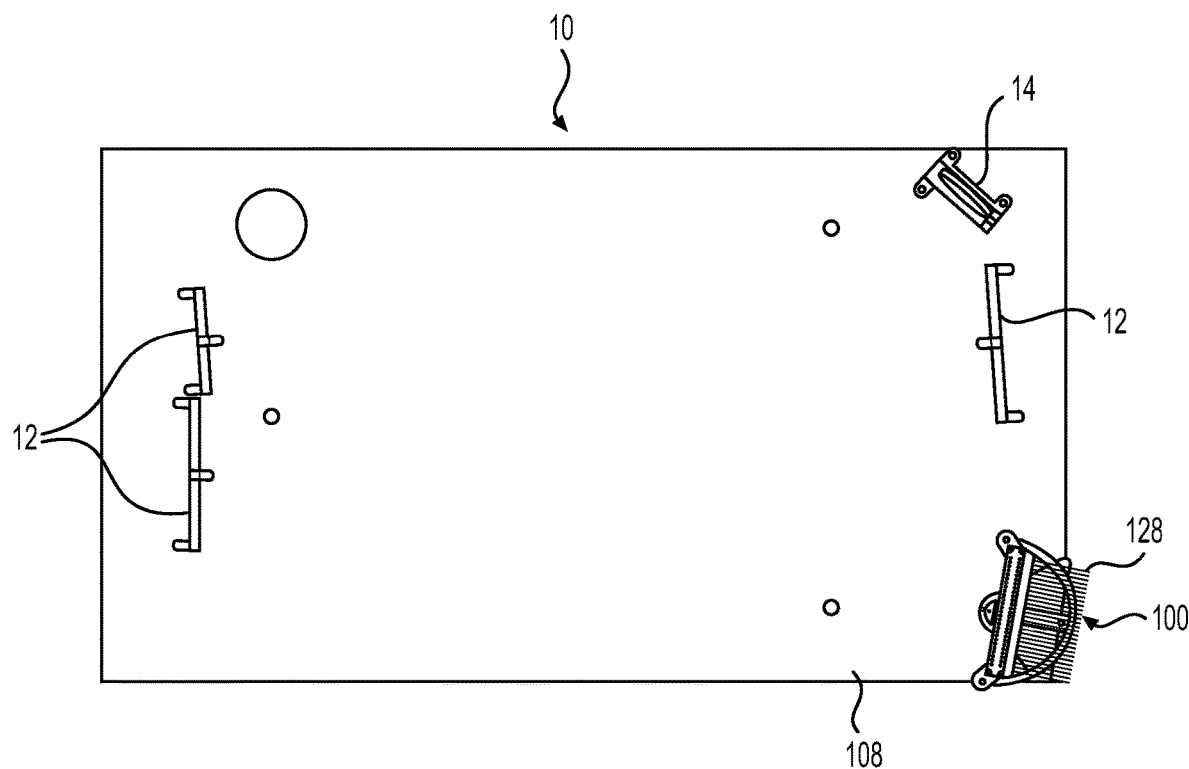

FIG. 1A illustrates an isometric view of an optical system 10, according to certain embodiment. FIG. 1B illustrates a top view of the optical system 10, according to certain embodiment. FIGS. 1A-1B illustrate that the optical system 10 includes an optical fiber holder 100 in contact with a working station 108 for holding a plurality of optical fibers 128. The optical fiber holder 100 can be mounted or attached to the working station 108. In some embodiments, the optical fiber holder 100 is threaded to the working station 108 through screws 140 (shown in FIG. 2B). Therefore, the optical fiber holder 100 stays on the pads 142 after threading screws 140 to the working station 108. The system 10 also includes mirrors 12 to reflect optical light from the optical fibers 128 back and forth to finally combine the light into one beam on the grating 14.

Figure 2A:
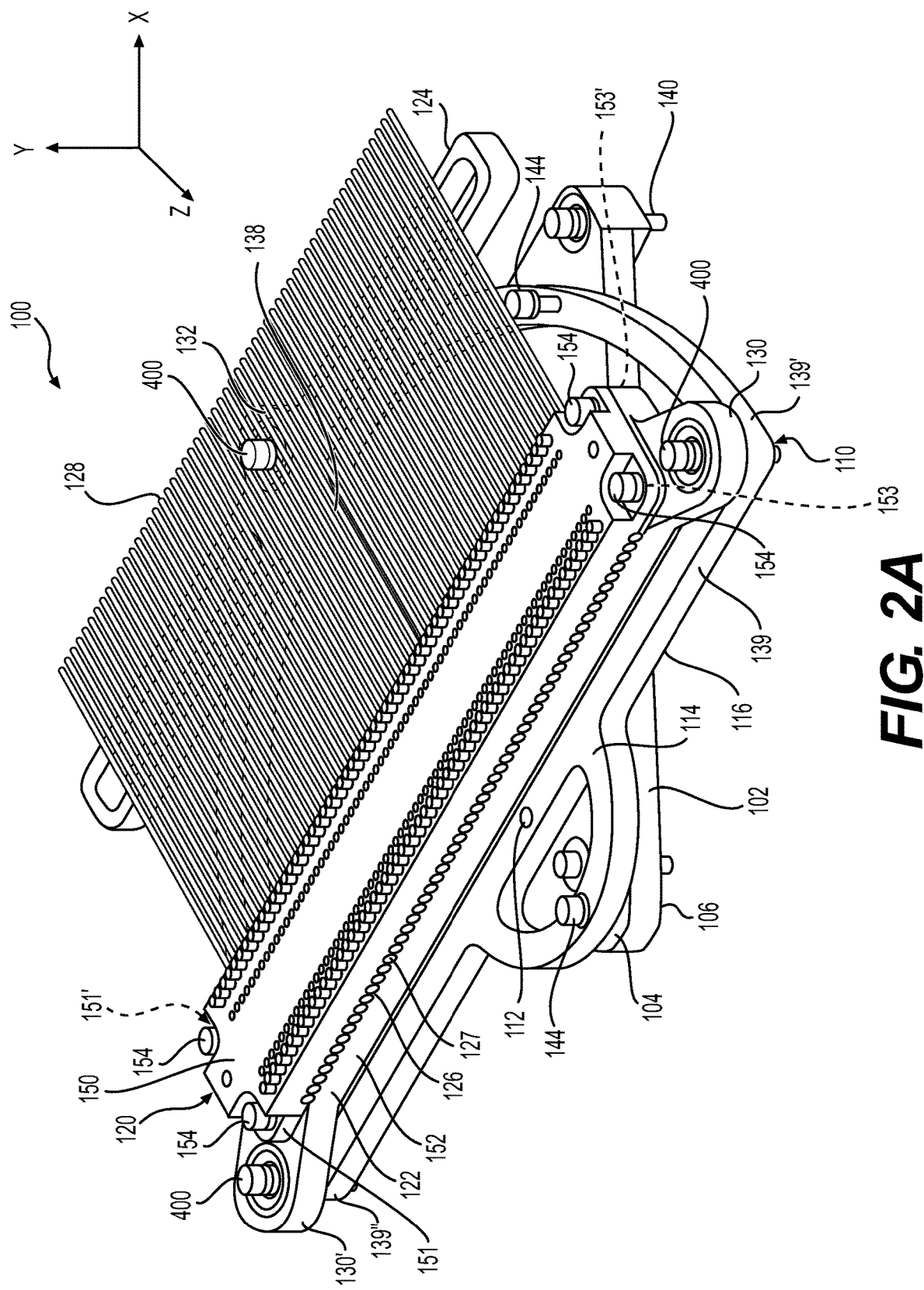
FIG. 2A-2B illustrate isometric views of an optical fiber holder, according to certain embodiments.
Figure 2B:
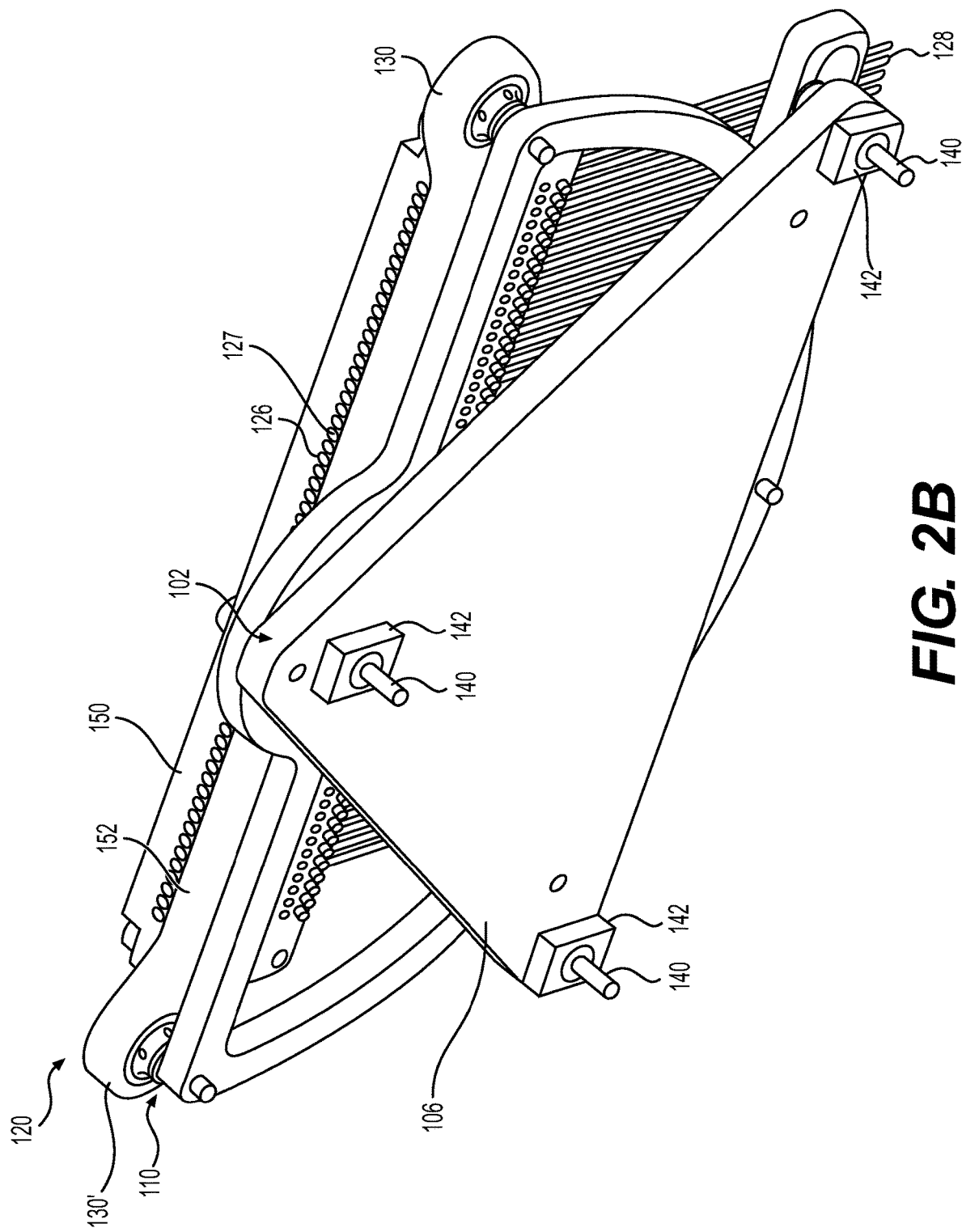
Figure 2C:
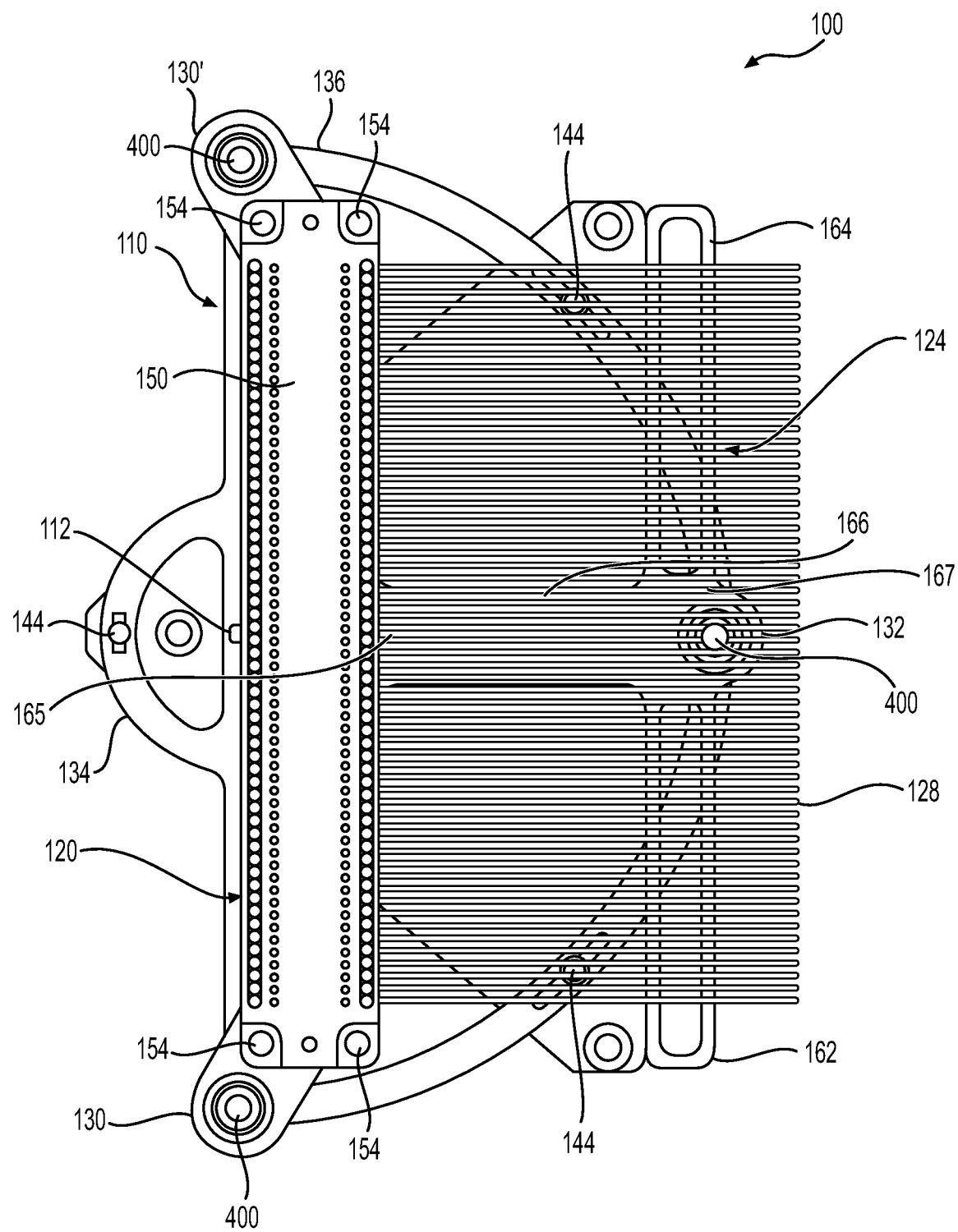
FIG. 2C illustrates a top view of the optical fiber holder of FIG. 2A, according to certain embodiments.

FIGS. 2A-2C illustrate various views of the optical fiber holder 100, according to certain embodiments. FIGS. 2A-2B illustrate the optical fiber holder 100, according to certain embodiments. FIG. 2C illustrates a top view of the optical holder 100, according to certain embodiments. Referring to FIGS. 2A-2C, the optical holder 100 can have a first holder 102. The first holder 102 can have any shape, e.g., rectangular, circular, triangular, or any shape. In some embodiments, the first holder 102 is a triangular plate. The first holder 102 has a first upper surface 104 and a first lower surface 106. The first holder 102 is configured to be in contact with a working station 108 (shown in FIG. 1A) through the first lower surface 106. The first holder 102 can be attached to the working station 108 through various means, e.g., screws 140. In some embodiments, the optical fiber holder 100 is attached to the working station 108 with three screws 140. The first holder 102 can move in virtual X and Z axes shown in FIG. 2A. The X and Z axes are in a plane parallel to the first lower surface 106 of the first holder 102. The first holder 102 can be fixed to the working station 108 after alignment of optical fibers 128. The first holder 102 can be made of any suitable material, e.g., plastics, metals, or alloys. The metals can be any metal, e.g., Aluminum, Stainless Steel, etc.

Figure 3B:
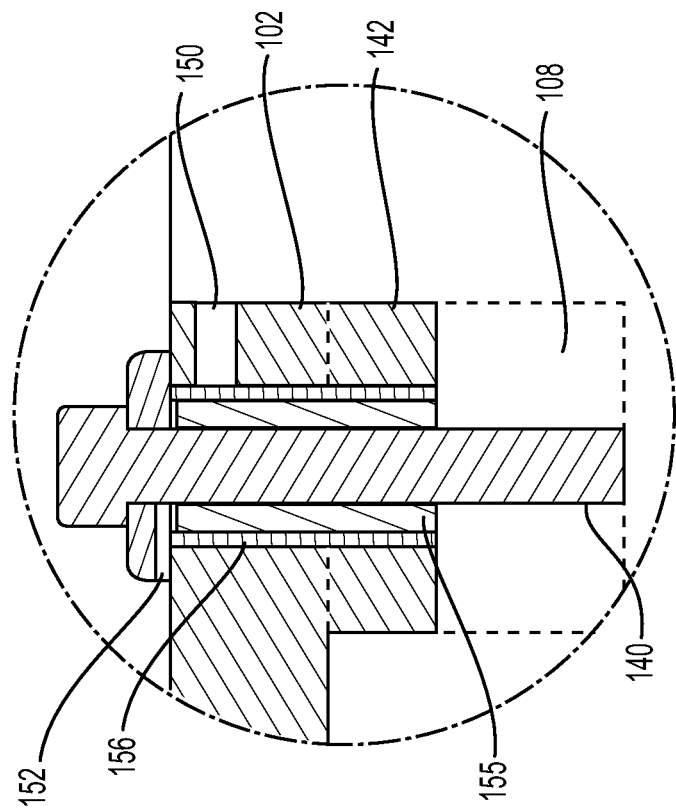
FIG. 3B illustrates a close up view of an attachment of the optical holder of FIG. 1, according to certain embodiments.
Figure 3A:
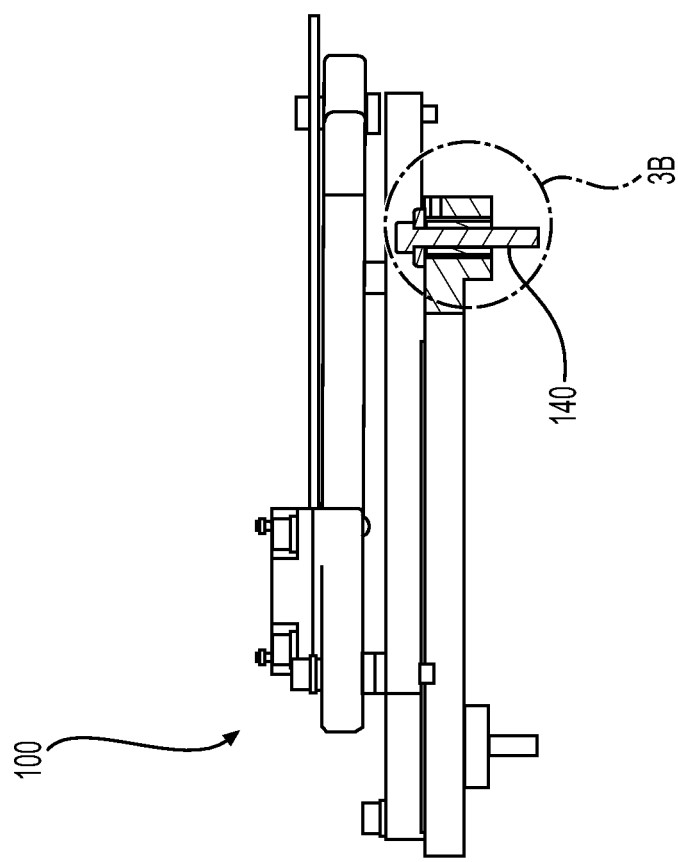
FIG. 3A illustrates a side view of the optical holder of FIG. 1, according to certain embodiments.

FIGS. 3A-3B illustrate a side view of the optical fiber holder 100 and a close up view of the screw 140. After alignment of optical fibers 128, the optical fiber holder 100 is threaded to the working station 108 through screws 140 and will be secured in its position to minimize or eliminate any movement of the optical fiber holder 100. As FIG. 3B illustrates, the part of the screw 140 which is in the first holder 102 and the pad 142 is surrounded by a sleeve 155. After alignment of the optical fibers 128, the screws 140 are threaded to the working station 108 and an adhesive material 156 is injected through holes 150 to bond the screws 140 and the sleeves 155 to the first holder 102. The excess amount of the adhesive (bond) can come out of the opening 152 to indicate that bonding is complete.

Figure 7:
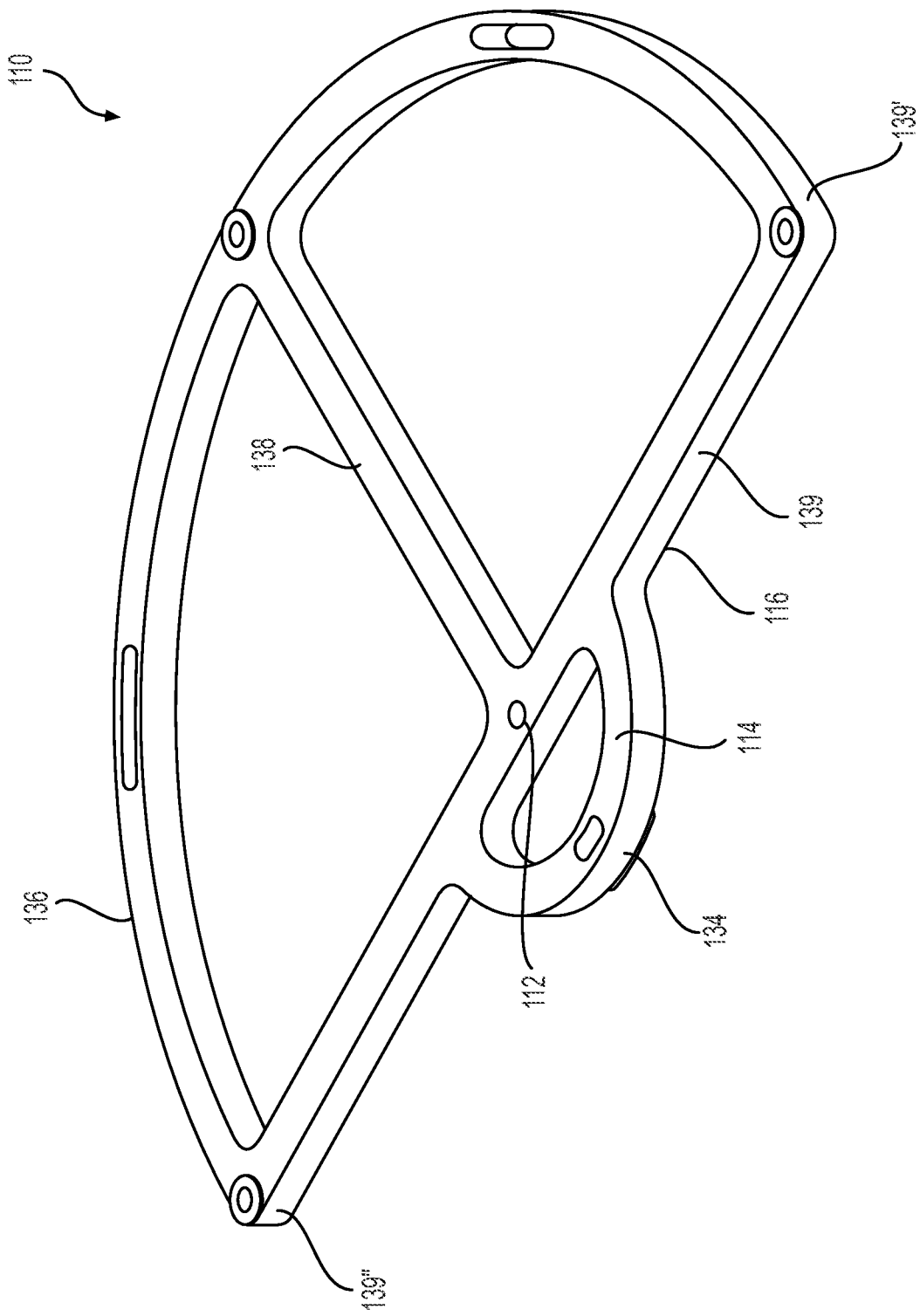
FIG. 7 illustrates the second holder of FIGS. 2A-2C, according to certain embodiments.

Referring to FIGS. 2A-2C, the optical fiber holder 100 can include a second holder 110 having a second upper surface 114 and a second lower surface 116. FIG. 7 also illustrates the second holder 110. The second lower surface 116 is operably attached to the first holder 102. The second holder 110 can rotate with respect to the first holder 102 at a pivot point 112. The second holder 110 can be attached to the first holder 102 through various means, e.g., screws 144. The second holder 110 can be fixed to the first holder 102 after alignment of optical fibers 128 by screws 144. The second holder 110 can have any shape. For example, the second holder 110 can be rectangular, circular, triangular, or any shape. The second holder 110 can be made of any suitable material, e.g., plastics, metals, or alloys. The metals can be any metal, e.g., Aluminum, Stainless steel, etc.

In some embodiments, second holder 110 includes a first beam 139 having a first end 139' and a second end 139". The second holder 110 can include a first curved piece 136 being attached to the first end 139' and the second end 139" of the first beam 139. In addition, the second holder 110 can include a second curved piece 134 being attached to the first beam 139 at an opposite side of the first beam 139 from the first curved piece 136. Further, the second holder 110 can include a second beam 138 being attached to the first curved piece 136 and the first beam 139. Second beam 138 can be perpendicular to the first beam 139.

Figure 8:
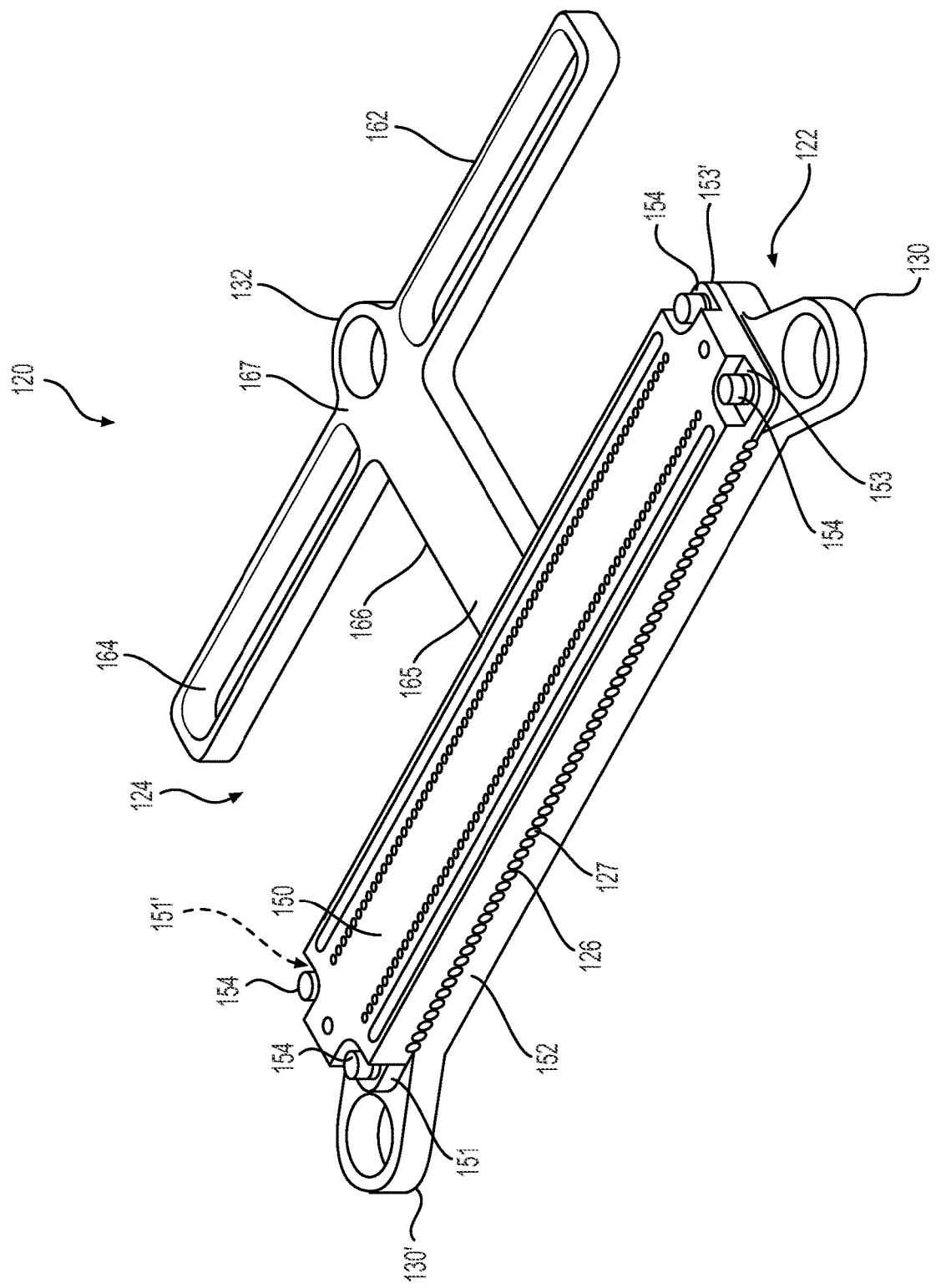
FIG. 8 illustrates the third holder of FIGS. 2A-2C, according to certain embodiments.

As FIGS. 2A-2C illustrate, the optical fiber holder 100 can include a third holder 120 having a first portion 122 and a second portion 124. FIG. 8 also illustrates the third holder 120. The first portion 122 can include a plurality of holes 126 therethrough. The plurality of holes are configured to receive a respective plurality of optical fibers 128. Each hole of the plurality of holes 126 can include a respective end cap of the plurality of end caps 127 (shown in FIG. 6). The plurality of end caps 127 are configured to rotate and translate in the plurality of holes 126.

In some embodiments, the first portion 122 of the third holder 120 includes a planar top piece 150. The planar top piece 150 can have any shape. In some embodiments, the planar top piece 150 has a rectangular shape. The first portion 122 of the third holder 120 can have a planar bottom piece 152. The planar bottom piece 152 can have any shape. In some embodiments, the planar bottom piece 152 has a rectangular shape. The planar top piece 150 can have a first corner 151, a second corner 153, a third corner 151', and a forth corner 153'. A length between the first corner 151 and second corner 153 is greater than a length between the first corner 151 and the third corner 151'. Also, the length between the first corner 151 and second corner 153 is equal to a length between the third corner 151' and the fourth corner 153'. The planar bottom piece 152 can be attached to the planar top piece 150 to define the plurality of holes 126 therethorugh. The plurality of holes 126 are located on a plane perpendicular to a virtual Y-axis. The Y-axis is shown in FIG. 2A and is defined from the first upper surface 104 to the first lower surface 106. Four screws 154 adjust the planar bottom piece 152 to the planar top piece 150 of the first portion 122 of the third holder 120 at the four corners 151, 151', 153, 153'.

Referring to FIGS. 2A-2C, the second portion 124 of the third holder 120 can include a third beam 166 having a first end 165 and a second end 167. The first end 165 of the third beam 166 can be attached to the planar bottom piece 152 of the third holder 120 and the second end 167 can be attached to a first hollow rectangular piece 162 and a second hollow rectangular piece 164. The first and second hollow rectangular pieces 162, 164 can be located at opposite sides of the third beam 166 and can be in a same plane as the third beam 166.

One of the purposes of the two hollow rectangular pieces 162, 164 is to secure the optical fibers 128 to them for additional support as optical fibers 128 are brittle.

The third holder 120 can include a plurality of protrusions 130, 130', and 132. In some embodiments, the third holder 120 includes a first protrusion 132, a second protrusion 130', and a third protrusion 130. As shown in FIGS. 2A-2C, the first protrusion 132 is located at the second end 167 of the third beam 166. The second protrusion 130' and the third protrusion 130 are connected to the planar bottom piece 152 at the first corner 151 and the second corner 153 respectively. The protrusions 130, 130', 132 are operably coupled to the second holder 110 and are configured to enable the third holder 120 to move.

In some embodiments, the three protrusions 130, 130' and 132 connect the third holder 120 to the second holder 110 through linear adjusters 400 as described below.

Figure 5B:
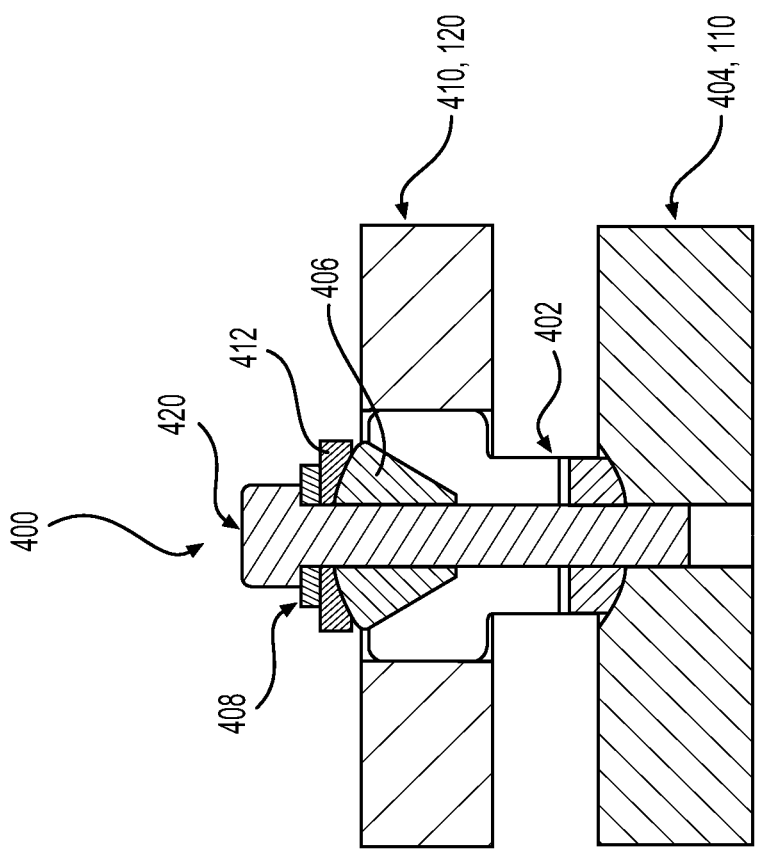
FIG. 5A-B illustrate a linear adjuster, according to certain embodiments.
Figure 5A:
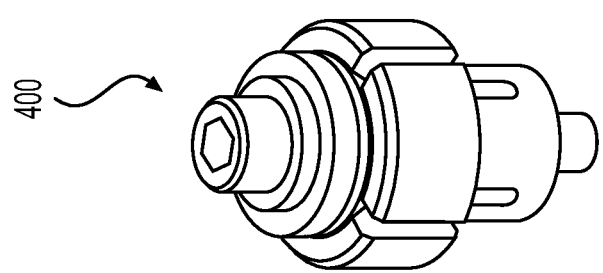

FIGS. 5A-5B illustrate a linear adjuster 400 that connects the third holder 120 to the second holder 110. The linear adjuster 400 consists of a threaded adjuster body 402 which contacts the second holder 110 and is free to rotate at this contact. The item to be adjusted contains a threaded interface which matches the thread of the adjuster body 402. That is, the third holder 120 contains a threaded interface which matches the thread of the adjuster bodies. The threaded adjuster body 402 is typically slotted like a collet such that a wedge 406 may be driven into the body 402 to expand it outward, locking the adjuster threads into the adjusted item threads. The wedge 406 may be formed by creating a separate conical part with a through hole feature that allows a fastener 420 to pass through its central axis, washer 408, spherical washer 412, and threads into the mounting interface, e.g., second holder 110.

In practice, the adjuster body 402 is rotated to create a linear adjustment between the adjusted item 410, i.e., third holder 120, and mounting interface 404, i.e., second holder 110. After desired adjustments are made to all three linear adjusters in the protrusions 130, 130', 132, the adjuster body 402 is constrained from rotation, typically with a tool, and the fastener 420 is then torqued which wedges the conic into the adjuster body 402, causing the body 402 to expand and creating a high-friction thread lock between the adjuster body 402 and the adjusted item 410.

The present disclosure can provide the alignment of the plurality of the optical fibers 128 in 6 degrees of freedom. Translation of the fibers as an array, i.e., plurality of fibers 128, along Y-axis only, occurs at times the first protrusion 132, the second protrusion 130', and the third protrusion 130 all move along the virtual Y-axis in a same direction. Translation of the plurality of fibers 128 (as an array) along the X-axis only, occurs through the movement of the optical fiber holder 100 in the virtual X-axis. Translation of the plurality of fibers 128 (as an array) along the Z-axis only, occurs through the movement of the optical fiber holder 100 in the virtual Z-axis. After the alignment of the plurality of fibers 128 through movement of the optical fiber 100 in the X-axis and/or the Z-axis, the optical fiber holder 100 is fixed to the working station 108 by screws 140 as explained above.

The rotation of the plurality of the optical fibers 128 about the virtual Y-axis only, occurs by rotation of the second holder 110 about the first holder 102 at the pivot point 112. The rotation of the plurality of the optical fibers 128 about the virtual X-axis occurs by movement/adjustment of the linear adjuster 400 of the first protrusion 132. The rotation of the plurality of the optical fibers 128 about the virtual Z-axis occurs by adjustment of the linear adjuster 400 of the second protrusion 130' and the third protrusion 130 equal amounts but in opposite directions.

In some embodiments, the translation of the plurality of fibers 128 along Y-axis and rotation about the X-axis occurs by adjustment of the linear adjusters 400 of the second protrusion 130' and the third protrusion 130 equal amount and in the same directions (both up or both down). In some embodiments, the plurality of optical fibers 128 translates along the Y-axis and also rotates about the X-axis and Z-axis, only by adjusting the linear adjuster 400 of the second protrusion 130' or the third protrusion 130.

Further, the present disclosure provides the alignment of each optical fiber of the plurality of optical fibers 128 in 6 degrees of freedom. That is, each optical fiber can be aligned individually in 6 degrees of freedom. The rotation of each optical fiber about the virtual Y-axis and the virtual Z-axis is provided through precision tooling. The translation of each optical fiber along the virtual X-axis and Z-axis is provided by precision tooling too.

Figure 4A:
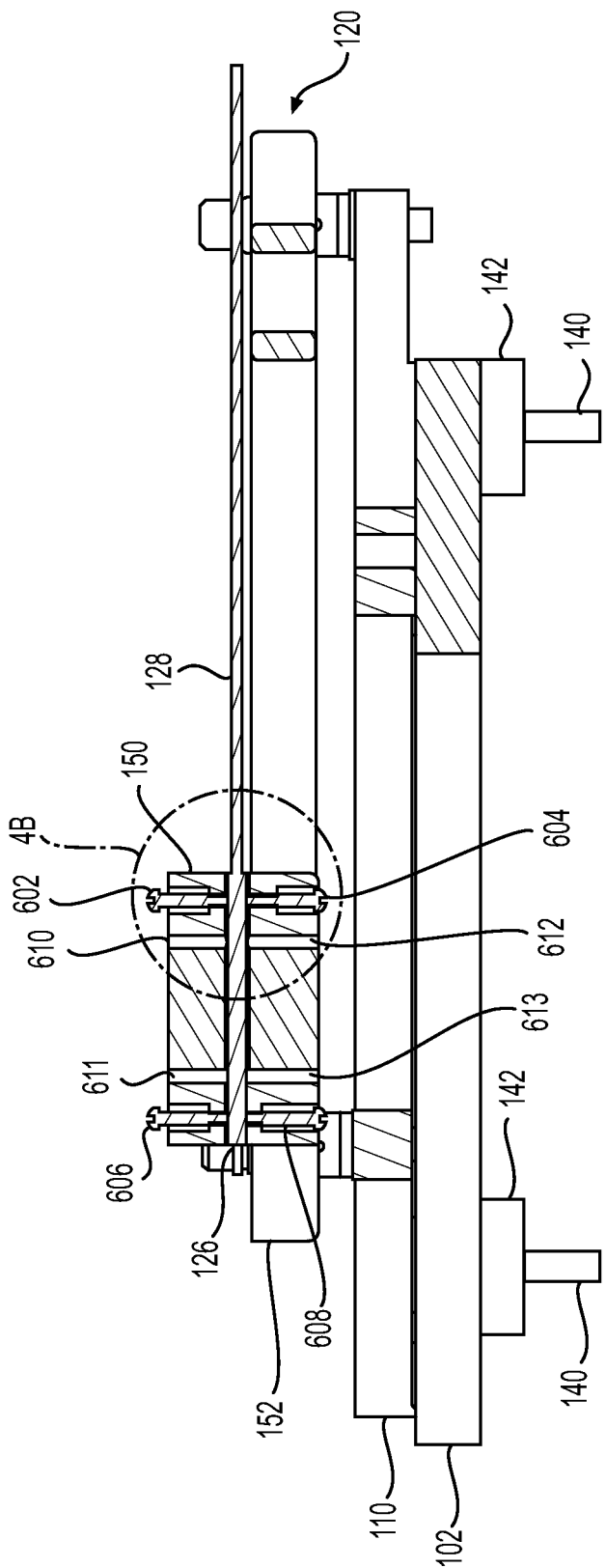
FIG. 4A-4B illustrate side view and close up view of the optical fiber holder and optical fibers of FIG. 1A, according to certain embodiments.
Figure 4B:
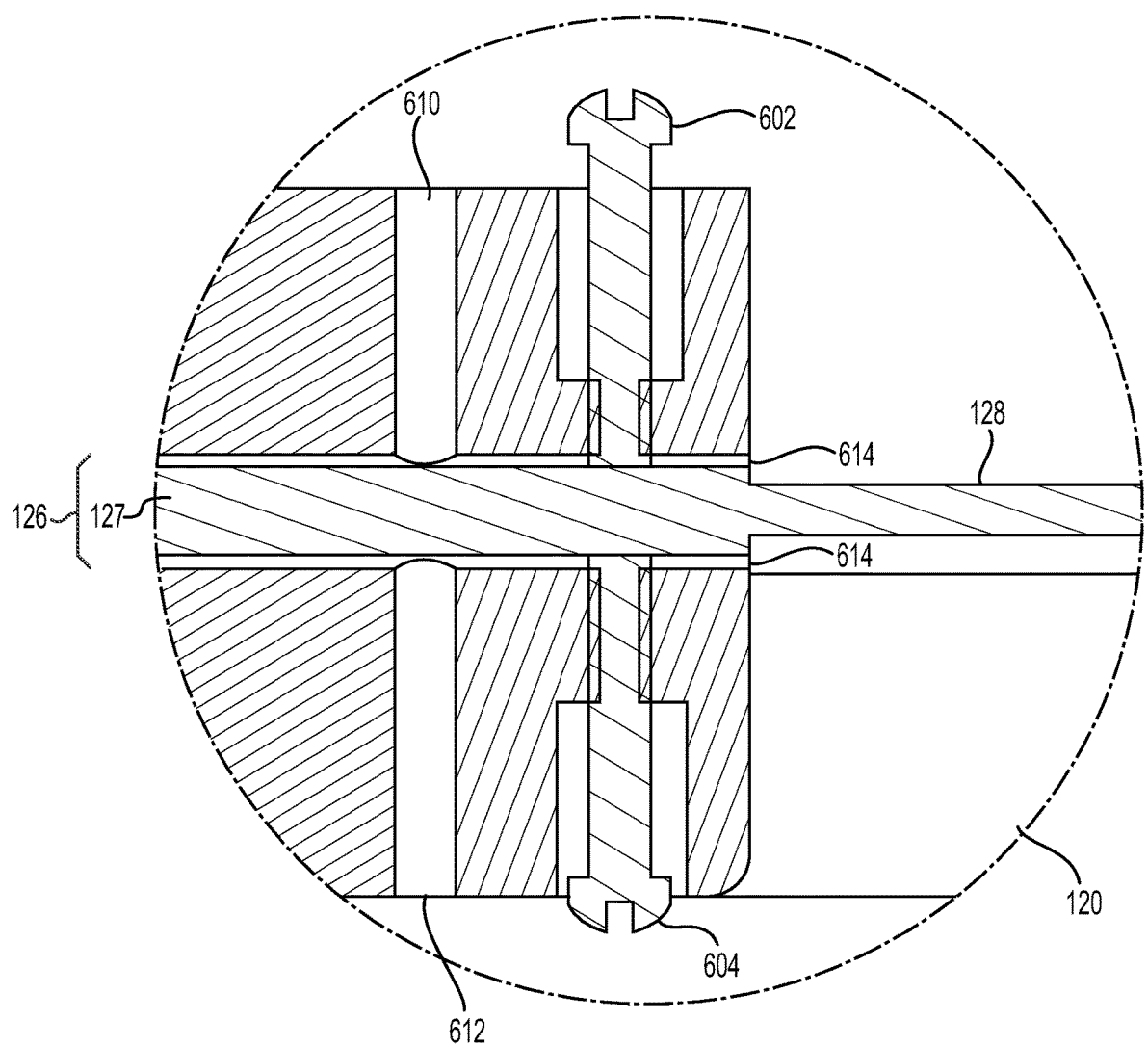
Figure 4C:
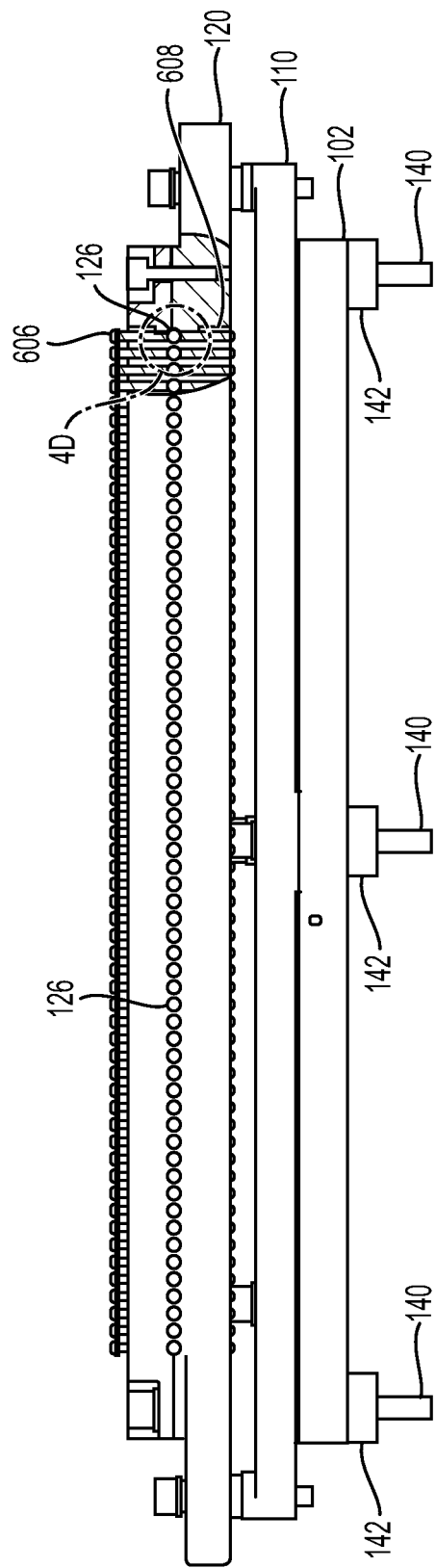
FIG. 4C-4D illustrate front view and close up view of the optical fiber holder and optical fibers of FIG. 1A, according to certain embodiments.
Figure 4D:
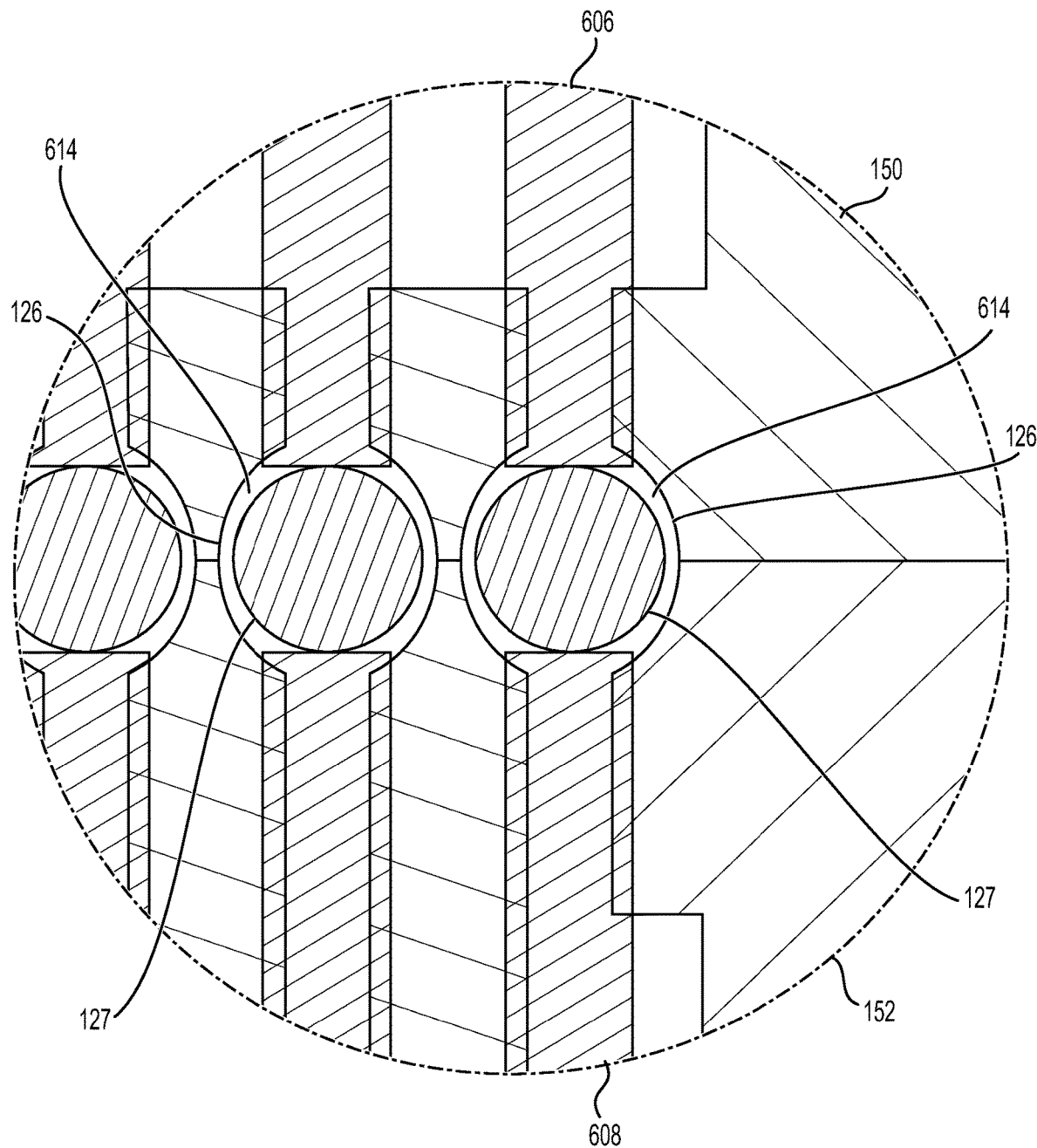

The rotation of optical fibers about the X-axis can be performed by screws shown in FIGS. 4A-4D. FIGS. 4A-4D illustrate side view, front view and close up views of the optical fiber holder 100. As shown, each optical fiber of the plurality of the optical fiber 128 is secured in their respective hole 126 by four screws 602, 604, 606, 608 between the planar top piece 150 and the planar bottom piece 152 of the first portion 122 of the third holder 120. The four screws 602, 604, 606, 608 are in contact with the end caps of the optical fibers. To align the optical fibers individually, the screws 602, 604, 606, 608 could be moved up or down (along the virtual Y-axis) to adjust the fibers to a desired alignment. After the optical fibers are aligned in holes 126, adhesive or bond material 614 will be injected through holes 610, 612, 611 and 613 to hold the optical fibers in the desired position. FIG. 4D illustrates the front view of the optical fibers in their respective holes 126 being surrounded by bond material 614.

The rotation of the optical fiber about the virtual X-axis occurs by adjustment of the screws 602, 604, 606, and 608 along the virtual Y-axis in equal amount, but the screws 602 and 604 are moved in opposite direction with respect to the screws 606 and 608. The translation of the optical fiber along the virtual Y-axis occurs by adjustment of the 602, 604, 606, and 608 along the virtual Y-axis in equal amount and in same direction.

Referring to FIGS. 2A-2C, after alignment of fibers, each of the plurality of fibers 128 will be secured in a respective hole of the plurality of holes 126 with an adhesive material. As a result, the adhesive material will hold the plurality of optical fibers 128 in their respective holes 126 after alignment.

Figure 6:
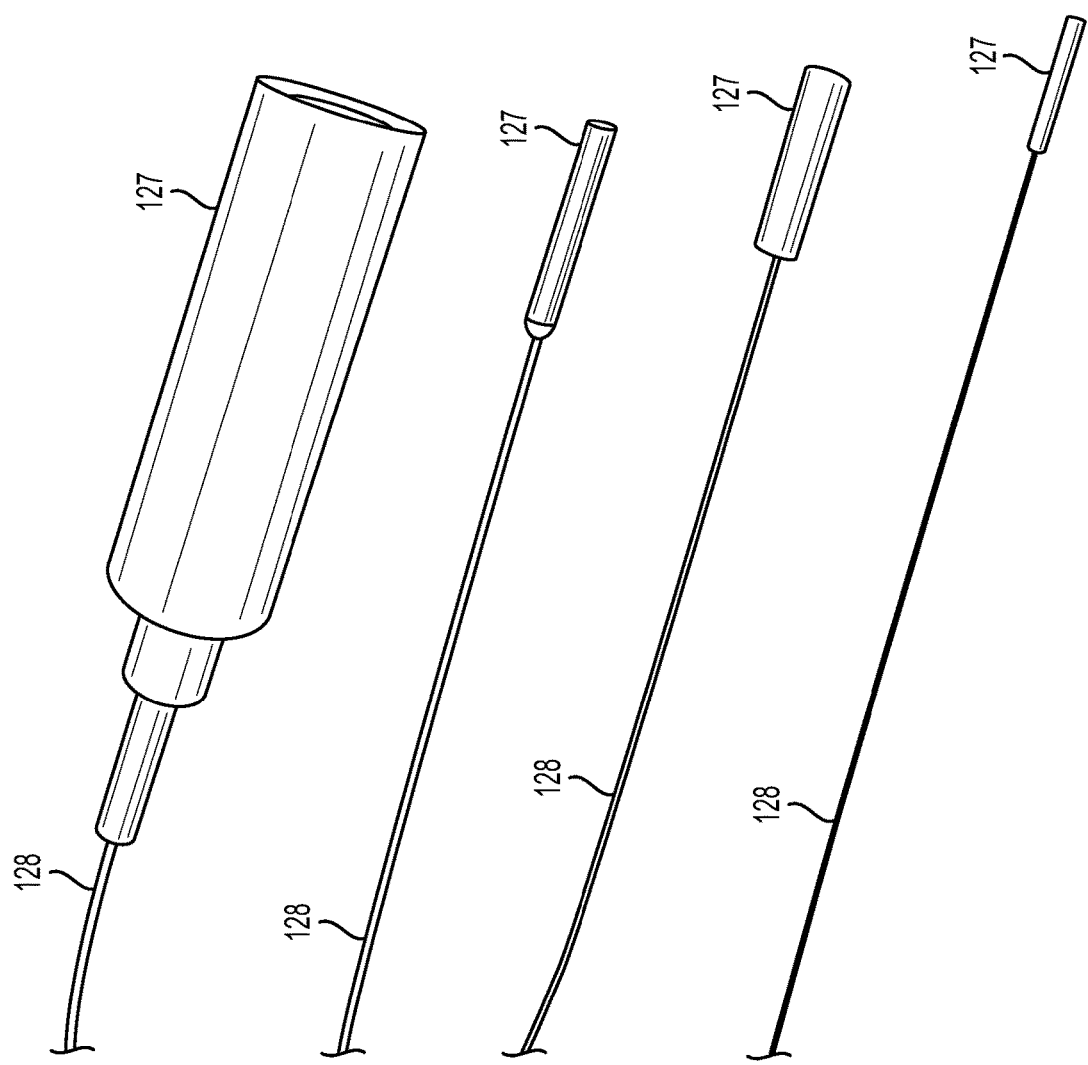
FIG. 6 illustrates exemplary optical fibers with end caps housed in a metal.

FIG. 6 illustrates various optical fibers 128 with end caps 127. The end caps 127, which are attached to the optical fibers 128, include optical glasses, e.g., fused silica, and are encased in a protective metal housing, e.g., stainless steel surgical tubing, etc. The end caps 127 can be placed in the holes 126 of first portion 122 of the third holder 120. The holes 126 can include the whole length of end caps 127 or a portion of the end caps 127. In some embodiments, the holes 126 can include the end caps 127 and some portion of the optical fibers 128.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

The invention claimed is:

1. An optical fiber holder, comprising:
   a first holder having a first upper surface and a first lower surface and configured to be in contact with a working station through the first lower surface;
   a second holder having a second upper surface and a second lower surface, the second holder being operably attached to the first holder through the second holder lower surface, the second holder being configured to rotate with respect to the first holder in a plane parallel to the first upper surface; and
   a third holder including a first portion having plurality of holes therethrough, each hole is configured to receive a respective optical fiber of a plurality of optical fibers, the first portion having a plurality of protrusions operably coupled to the second holder and configured to enable the third holder to move with respect to the second holder;
   wherein each of the plurality of optical fibers has an endcap and is configured to rotate and translate in the plurality of holes.

2. The optical fiber holder of claim 1, wherein the plurality of protrusions are connected to the second holder through a plurality of adjusters.

3. The optical fiber holder of claim 2, wherein the plurality of protrusions comprises of first, second and third protrusions.

4. The optical fiber holder of claim 3, wherein the first portion of the third holder comprises:
   a planar top piece; and
   a planar bottom piece having first, second, third, and fourth corners, a length between the first and second corners being greater than the length between the first and the third corners and being equal to the length between the third and fourth corners, the planar bottom piece being attached to the planar top piece and defining the plurality of holes therethorugh, the plurality of holes being located on a plane perpendicular to the a virtual Y-axis defined from the first upper surface to the first lower surface,
   wherein the second and the third protrusions are connected to the bottom piece at the first corner and the second corner, respectively.

5. The optical fiber holder of claim 4, wherein the first holder is configured to move along a virtual X-axis and a Z-axis defined in a plane parallel to the first lower surface of the first holder.

6. The optical fiber holder of claim 5, wherein the third holder:
- moves in the virtual Y-axis at times the first, second, and third protrusions move along the virtual Y-axis;
- rotates about the virtual X-axis at times the first protrusion moves along the virtual Y-axis; and
- rotates about the virtual Z-axis at times the second and third protrusions move along the virtual Y-axis.

7. The optical fiber holder of claim 3, wherein the third holder comprises a second portion, the second portion including:
- a third beam having a first end and a second end, the first end being attached to the first portion of the third holder and the second end being attached to a first hollow rectangular piece and a second hollow rectangular piece, the first and second hollow rectangular pieces being located at opposite sides of the third beam and being in a same plane as the third beam,
- wherein the third beam includes the first protrusion at the second end being operably connected to the second holder.

8. The optical fiber holder of claim 1, wherein each of the plurality of holes includes an adhesive material to hold the optical fibers in their respective holes after alignment.

9. The optical fiber holder of claim 1, wherein the plurality of the optical fibers comprises a respective plurality of end caps.

10. The optical fiber holder of claim 9, wherein each of the plurality of end caps is located in a respective one of the plurality of holes.

11. The optical fiber holder of claim 9, wherein the plurality of end caps are made of fused silica.

12. The optical fiber holder of claim 1, wherein the second holder comprises:
- a first beam having a first end and a second end;
- a first curved piece being attached to the first end and the second end of the first beam;
- a second curved piece being attached to the first beam, the first curved piece and the second curved piece being located on opposite sides of the first beam; and
- a second beam being attached to the first curved piece and the first beam, the second beam being perpendicular to the first beam.

13. A method of aligning a plurality of optical fibers, comprising:
- attaching a first holder, having a first upper surface and a first lower surface, to a working station through the first lower surface;
- attaching a second holder, having a second upper surface and a second lower surface, to the first holder through the second lower surface, such that the second holder is rotatable with respect to the first holder in a plane parallel to the first upper surface;
- attaching a third holder, having a third upper surface and a third lower surface, to the second holder through the third lower surface such that the third holder is movable with respect to the second holder, the third holder including a first portion having plurality of holes therethrough; and
- inserting each of a plurality of optical fibers through respective holes of the plurality of holes in the third holder such that each of the plurality of optical fibers is rotatable and translatable in its respective hole.

14. The method of aligning a plurality of optical fibers of claim 13, wherein attaching the third holder to the second holder is through a plurality of protrusions.

15. The method of aligning a plurality of optical fibers of claim 14, wherein the plurality of protrusions include a first, second and third protrusions each having a linear adjuster.

16. The method of aligning a plurality of optical fibers of claim 15, wherein the third holder:
- moves in a virtual Y-axis, defined from the first upper surface to the first lower surface, at times the first, second, and third protrusions move along the virtual Y-axis;
- rotates about a virtual X-axis, defined in a plane parallel to the first lower surface of the first holder, at times the first protrusions move along the virtual Y-axis; and
- rotates about the a Z-axis, defined in the plane parallel to the first lower surface of the first holder, at times the second and third protrusions move along the virtual Y-axis.

* * * * *